United States Patent [19]

Haines

[11] 3,986,805

[45] Oct. 19, 1976

[54] MOLDING APPARATUS AND MEANS FOR SPACING THE MOLD PLATES

[76] Inventor: Fred E. Haines, 2444 Cabrillo Ave., Torrance, Calif. 90501

[22] Filed: Sept. 26, 1975

[21] Appl. No.: 616,943

[52] U.S. Cl. .......................... 425/242 R; 24/211 N; 249/68; 425/168; 425/444; 425/450.1; 425/451; 425/451.9
[51] Int. Cl.² ...................... B29F 1/14; B29C 7/00
[58] Field of Search .......... 425/441, 443, 444, 438, 425/451.7, 451.9, 242 R, 450.1, 451, 168; 24/211 N; 249/67, 68

[56] References Cited
UNITED STATES PATENTS

| | | | |
|---|---|---|---|
| 2,255,695 | 9/1941 | Bull | 24/211 N X |
| 3,044,121 | 7/1962 | Wiskoff et al. | 249/68 |
| 3,085,462 | 4/1963 | Myers | 24/211 N X |
| 3,137,905 | 6/1964 | Steinman et al. | 425/438 X |
| 3,669,599 | 6/1972 | Snider et al. | 425/451.7 X |

*Primary Examiner*—Robert L. Spicer, Jr.
*Attorney, Agent, or Firm*—Huebner & Worrel

[57] ABSTRACT

Apparatus for spacing and moving parts, as in a hydraulically operated molding press, arranged for relative movement in which there are means for engaging with and disengaging from the parts at predetermined positions. In a molding press, the apparatus is fitted internally and operates to separate the two mold cavity plates from the fixed clamp plate, positioning the three plates in a spaced relationship. The apparatus also provides for an early return of the ejector plate to in effect withdraw the ejector pins from the mold cavities before the mold closes after the molded piece has been ejected.

8 Claims, 14 Drawing Figures

MOLDING APPARATUS AND MEANS FOR SPACING THE MOLD PLATES

BACKGROUND OF THE INVENTION

The invention relates to hydraulically operated molding presses and generally to devices for spacing parts, adapted for relative movement, in predetermined positions.

In the prior art, molding presses have had devices for spacing the various plates and for providing for an early return of the ejector plate, but these devices have been externally of the plates so as to require additional space. These prior art external devices are fitted to the presses by drilling and tapping holes in the ends of the plates. Accurate drilling into the ends of heavy steel plates is very difficult in comparison with drilling into their faces. It is also more difficult to set up large heavy steel plates in drill presses on their ends than it is on their sides.

In the present invention the devices are installed internally and thus require no additional space over that required by the mold plates. In addition, because the devices are inserted internally into the plates, the holes are drilled into the sides of the plates rather than in their ends. This eliminates the difficult end drilling required in the prior art.

SUMMARY OF THE INVENTION

The present invention provides new devices for spacing plates of hydraulic molding presses, and other parts arranged for relative movement, internally of the parts.

Accordingly, it is an object of the present invention to provide an improved hydraulically operated molding press.

It is another object of the invention to provide devices for spacing the plates in a hydraulically operated molding press, and in other tools and apparatus in which parts are arranged for relative movement with respect to each other.

It is still another object of the invention to provide means for effecting an early return of an efector plate in a hydraulically operated molding press. The so-called early return of the ejector plate and the ejector pins is necessary to avoid damage to structures operating within the mold cavities when the press is closed after the ejection of the previously molded pieces. When, for example, in a standard press the B plate is moved to its open position, it moves onto the ejector pins which then extend into the molding cavity to eject the molded piece or pieces. When the mold again closes, it is necessary to withdraw the ejector pins from the mold cavity or the mold cavity from the pins, so that on closing no damage can be done by the pins to structures reentering the mold cavities from the side. In the present invention the ejector plate and pins are held in a predetermined position by means of the spacing devices while the B plate starts to move to its closing position. During the closing action the B plate continues to close and the ejector plate starts at a later time to also move to its closing position, the ejector pins and B plate arriving at their respective closing positions at approximately the same time.

It is a further object of the present invention to provide spacing parts, as described in the previous paragraphs, that may be relatively easily installed within existing molding presses, as well as in new molding presses during manufacture.

It is a still further object of the invention to provide spacing devices, as described in the previous paragraphs, which may be installed internally, rather than externally, so that the devices do not require additional space.

It is another object of the invention to provide spacing devices, as described in the previous paragraphs, that will space or float the A plate in a standard molding press from the fixed clamp plate in a predetermined position. Such spacing in necessary, for example, to permit the removal of the sprue and the removal of runners in presses having multiple cavities. These runners of molded plastic material are set during the regular molding operation, and must be removed from the grooves in which the plastic travels to the multiple cavities so that when the press is again closed, the grooves are empty and available to receive the fluid plastic therein.

The floating of the A plate also provides space for removing molded parts from split cavities having wedges which move out of the cavities so that the molded parts can be ejected.

It is still another object of the invention to provide spacing devices, as described in the preceding paragraphs, that permit easy, non-precise fits.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

DESCRIPTION OF THE PREFERRED EMBODIMENTS

Figure 1:
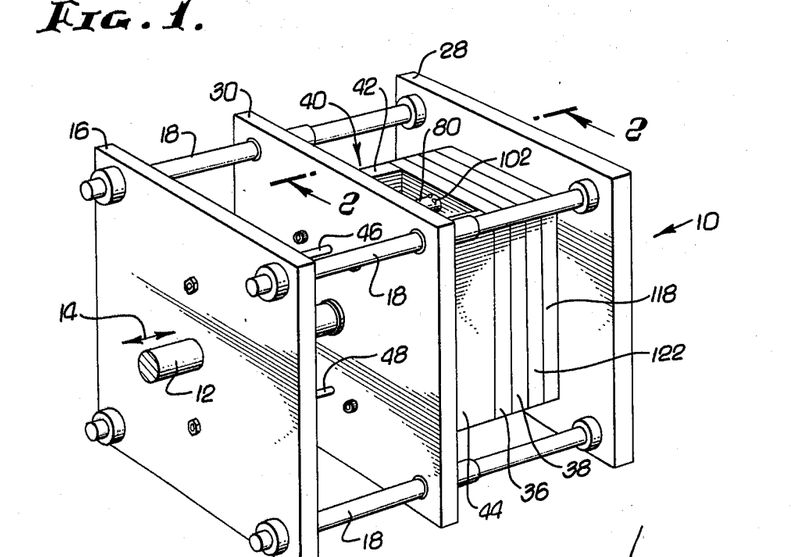
FIG. 1 is a schematic perspective view of a power-actuated molding press in the closed position.
Figure 2:
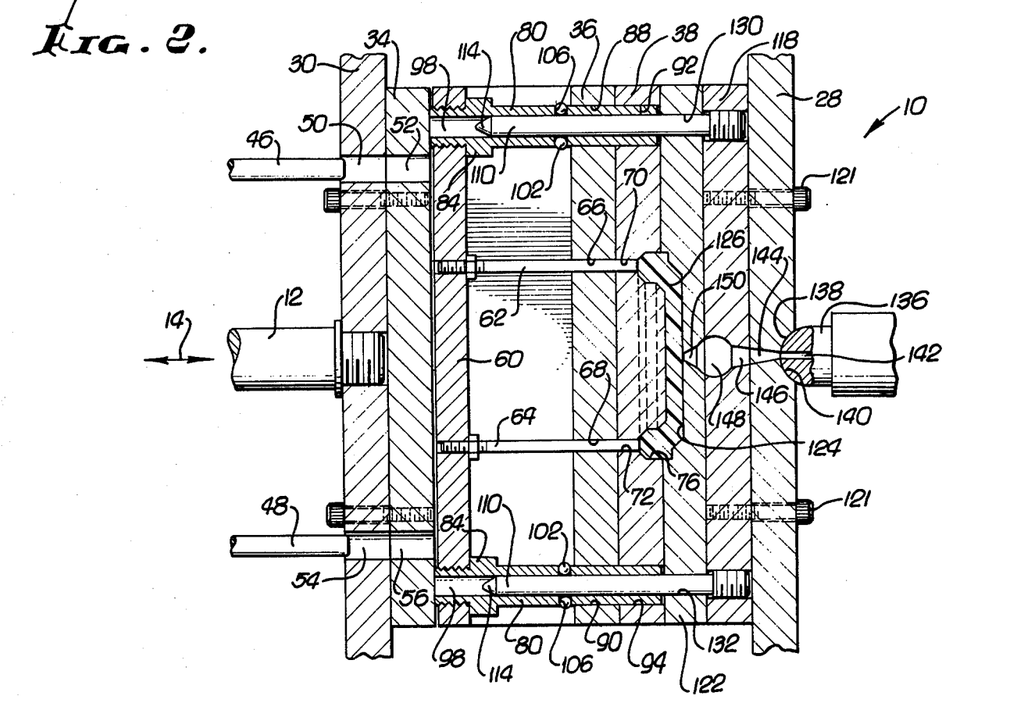
FIG. 2 is a cross-sectional side view of a molding press in the closed position, taken along the line 2—2 of FIG. 1.

Referring again to the drawings, there is shown in FIGS. 1 and 2 a schematic view of a power-actuated molding press, generally designated as 10, in the closed position. Such presses are typically operated by a hydraulic ram, not shown, which move an operating rod 12 in opposite directions, as indicated by the arrows 14. The rod 12 is fitted for slidable movement in an end frame member 16, which is secured by four frame posts 18 to a frame member 28 at the other end of the press. Inwardly of the frame member 16 is a plate 30 secured to the rod 12 for movement therewith, and being adapted to slide on the posts 18.

Also secured to the plate 30 by means not shown are parallel plates 34, 36 and 38, and shown only in FIG. 1 are side plates 42 and 44, perpendicular to the parallel plates. The plates 34, 36, 38, 42 and 44 form an ejector housing, generally designated as 40, all being adapted to move with the rod 12 and plate 30. Fixed to the frame member 16 are parallel ejector stop rods 46 and 48, adapted to slide in bores 50 and 54, respectively, in plate 30 and in bores 52 and 56 in plate 34, respectively.

Adapted for slidable movement within the ejector housing is an ejector plate 60, not shown in FIG. 1, and secured to and extending therefrom, within the housing, are ejector pins 62 and 64 adapted to slide in bores 66 and 68, respectively, in plate 36, and in bores 70 and 72 in plate 38, respectively. In FIG. 2 the bores 70 and 72 terminate in a mold cavity 76 in plate 38. This plate is referred to in the trade as the "B" plate.

A pair of spaced sleeves 80 are secured at one of their ends to the ejector plate 60. Cylindrical spacing bosses 84 adjacent the sleeve ends abut the plate 60. The sleeves 80 extend through and are adapted to slide in respective bores 88 and 90 in plate 36, and in respective bores 92 and 94 in the plate 38.

The sleeves 80 have inner cylindrical bores 98. Annularly spaced balls 102 are retained in the respective sleeve walls in annularly spaced openings 106 extending through the walls. The openings are dinked to hold the balls therein. Extending into the respective sleeves are cylindrical rods or pins 110, adapted to be in slidable engagement with the balls. The pins have conical ends 114 and are secured at their other ends to a fixed clamp plate 118 which is secured to frame member 28 by means of bolts 121.

As shown in FIGS. 2, 3, 6 and 7, the balls have radially expanded and radially contracted positions. They are in the expanded position when the cylindrical pin surfaces are radially inwardly thereof and are movable to the retracted position when the cylindrical surfaces of the pins are out of radial alignment with the balls. The conical ends 114 provide for ease of entry of the pins among the balls to move them into the expanded positions, as shwon in FIG. 7.

Figure 3:
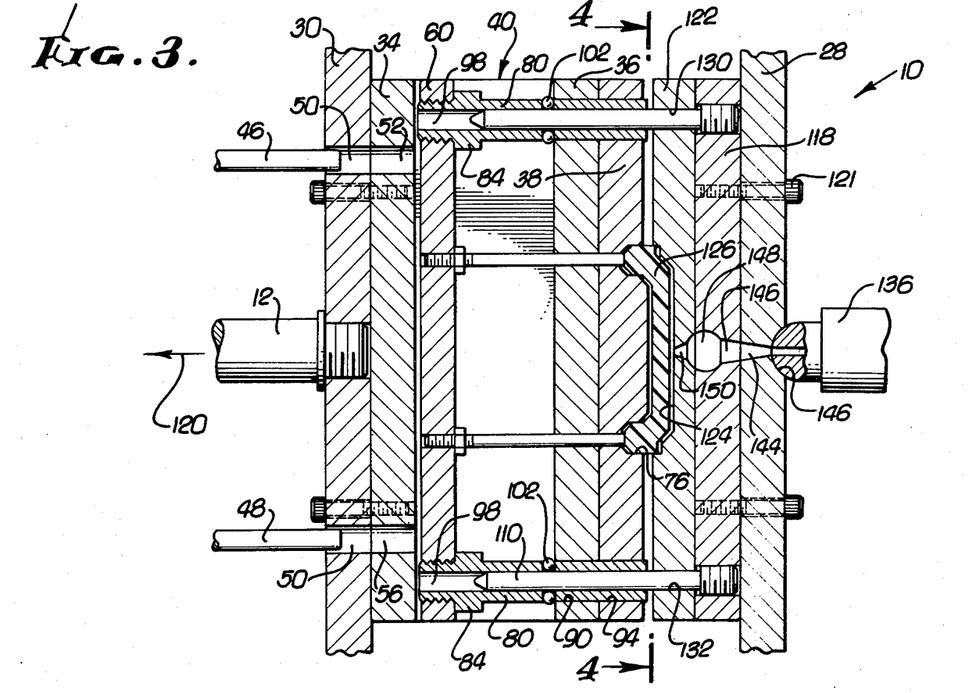
FIG. 3 is a view of the press shown in FIG. 2 just after it has started to open.

In FIG. 3 the balls are held radially outwardly by the pins and are in abutment with the plate 36 so that movement of the rod 12, and the plates 34, 36 and 38 in the direction of the arrow 120 causes the ejector plate 60 to be moved in the same direction. When the rod 12 is moved sufficiently in the direction of the arrow 120, the plate 36 is moved so that the cylindrical surfaces of the pins 110 are no longer in radial alignment with the balls, so that continued movement of the plate 36 ceases to move the plate 60 with it.

Figure 7:
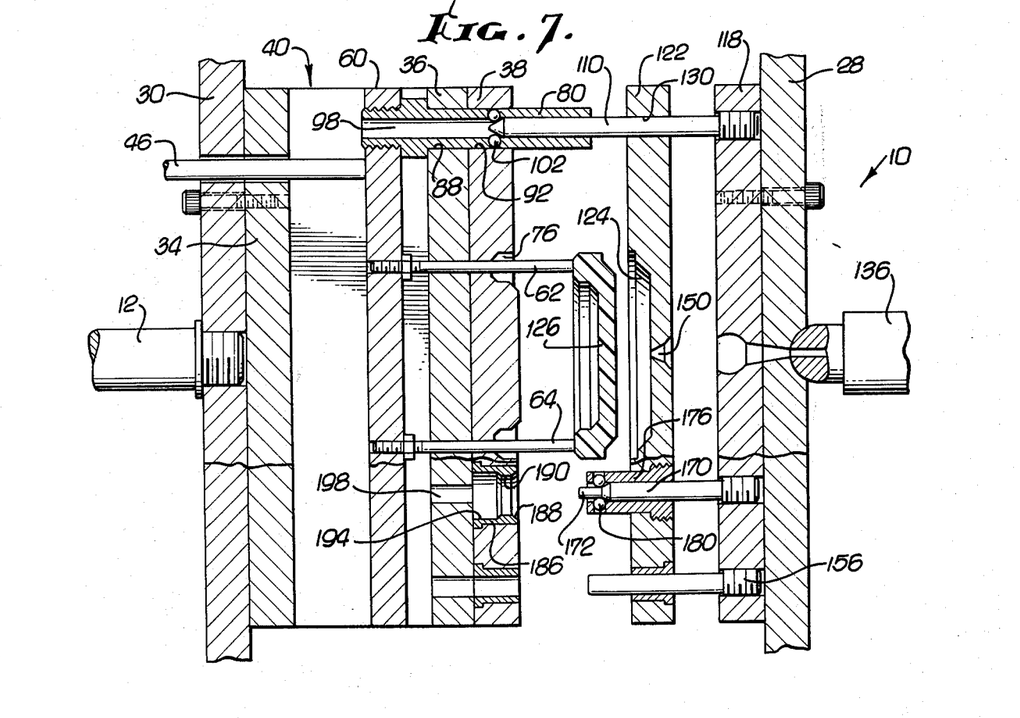
FIG. 7 is a view similar to FIG. 6, illustrating the press in the open position.

In FIG. 7 the plate 60 is shown to have been moved as far as it will go in the direction of the arrow 120, being stopped by the ejector stop rods 46 and 48, and in this position the balls 102 have been forced and held inwardly by the bores 88 and 90 in plate 36 and 92 and 94 in plate 38. Thus, when the rod 12 is moved in the direction opposite to that of the arrow 120, the pins 110 engage the balls to prevent the movement of the plate 60 in that direction until the balls are moved out of the bores in the plates 36 and 38.

Positioned between the plates 38 and 118 is a mold cavity plate 122, known in the trade as the A plate. The plate 122 has a mold cavity 124 in alignment with the cavity 76 in the plate 38, and in which is formed, when the cavities are closed, a molded workpiece, as 126. As shown in FIG. 2, the plate 122 has bores 130 and 132, which are adapted to slide on the fixed pins 110 when the plate is moved in the directions of the arrows 14.

When the mold is closed, as shown in FIG. 2, the plastic material to be molded is injected into the cavities through a nozzle 136, having a convex spherical tip 138, fitted into a concave recess 140 in the exterior of plate 28. An orifice 142 in the nozzle is in communication with a diverging conical-shaped orifice 144, aligned with a conical continuing orifice 146 in the plate 118, which expands into an approximately sphereical orifice 148, part of which is formed in the plate 118, and the other part in the plate 122. Extending from the orifice 148 is a converging conical orifice 150 opening to the mold cavity.

Figure 4:
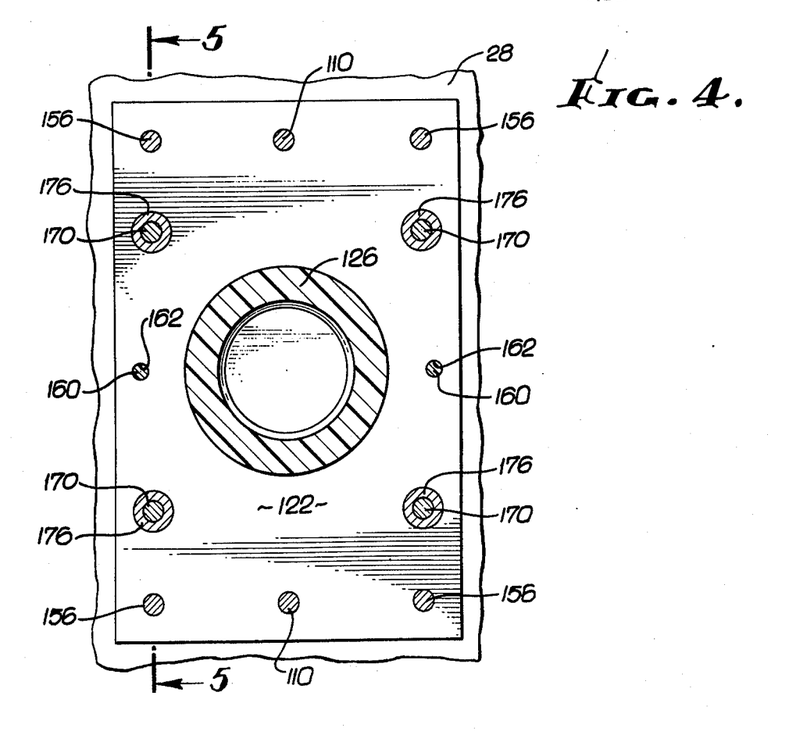
FIG. 4 is a plan view, taken along the line 4—4 of FIG. 3.
Figure 5:
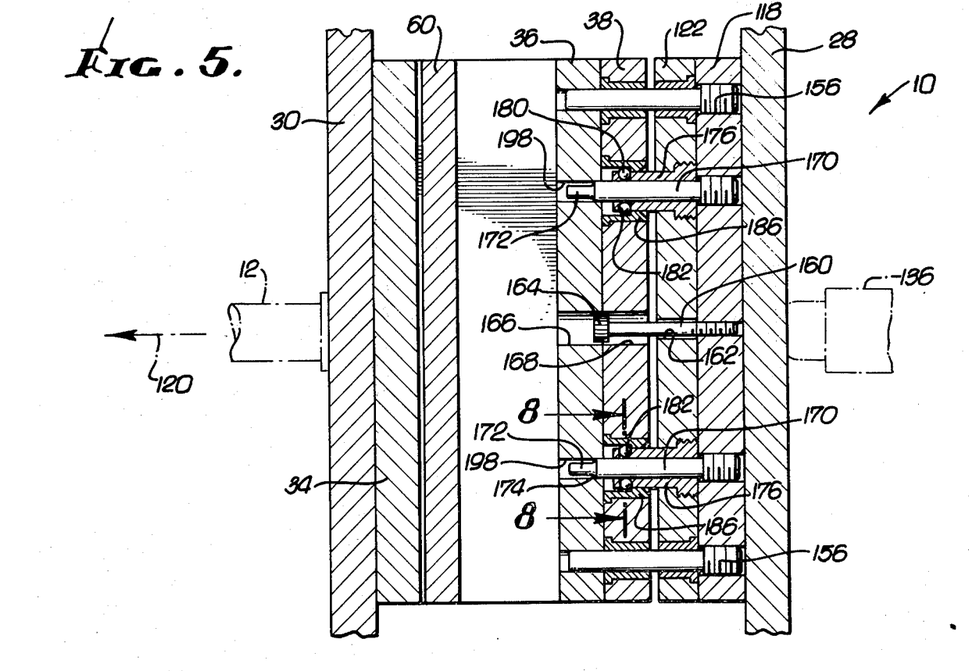
FIG. 5 is a cross-sectional side view of the press, taken substantially along the line 5—5 of FIG. 4.

As shown in FIGS. 4–7, the fixed plate 118 has four guide rods 156 secured therein adjacent the respective four corners. The plates 36, 38 and 122 have bores therein in which the rods fit in a slidable relationship. As shown in FIGS. 4 and 5, transversely spaced bolts 160 are threadedly engaged in the plate 118, extending through bores 162 in plate 122 and having heads 164 extendible into bores 166 and 168 in plates 36 and 38, respectively. The head 164 is positioned to limit the movement of the plate 122 in the direction of the arrow 120.

Figure 8:
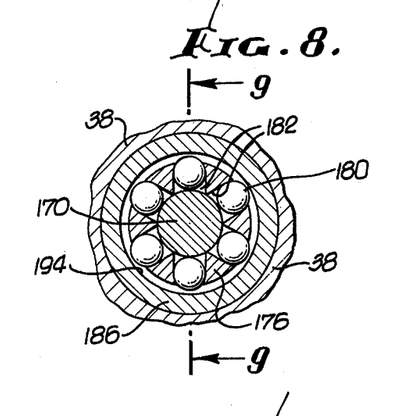
FIG. 8 is a plan view of a spacing device, taken along the line 8—8 of FIG. 5.
Figure 9:
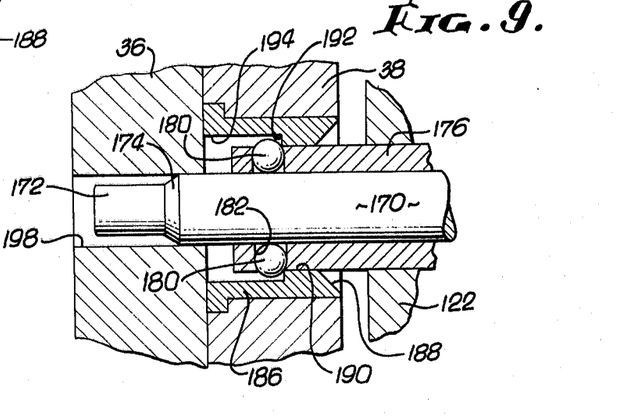
FIG. 9 is an enlarged view, taken along the line 9—9 of FIG. 8.
Figure 10:
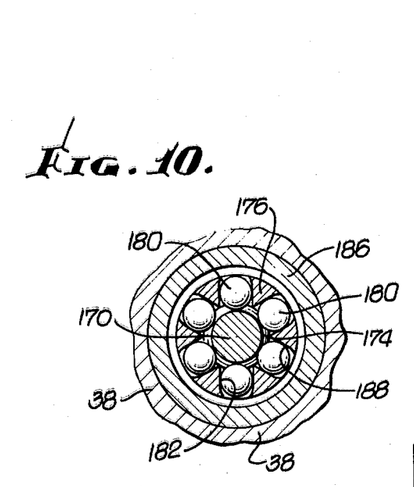
FIG. 10 is a view of the device shown in FIG. 8 in a different position, taken along the line 10—10 of FIG. 6.

Also threadedly engaged in the plate 118 are four cylindrical pins 170 having small diameter portions 172 at their outer ends, spaced from the large diameter portions by conical portions 174. Secured within the plate 122 are four cylindrical sleeves 176 in which the pins 170 are slidably engaged. As best seen in FIGS. 8, 9 and 10, adjacent the free ends of the sleeves 176, are a plurality of annularly spaced balls 180, retained in respective radially directed openings 182 in which they are adapted for radial contraction and expansion.

As shown in FIGS. 5–10, the plate 38 has four generally cylindrical inserts 186, and in which the sleeves 176 are adapted to be slidably engaged. Adjacent the plate 122, the inserts are chamfered at 188, and inwardly thereof have small diameter portions 190 on which are defined annular shoulders 192. Extending from the shoulders are large diameter portions 194. In FIG. 9 the balls 180 are in their radially expanded or extended positions, engaged with the shoulders 912, and in FIGS. 6, 7 and 10 in their retracted positions. When the large diameter portions of the pins 170 are in radial alignment with the balls they are expanded, and when the large portions are out of alignment, the balls are in retractable positions. The conical portions 174 and the small diameter portion 172 provide easy entry of the large diameter portion into alignment with the balls to move them from the retracted to the expanded positions.

The plate 36 has four bores 198 adapted to receive the pins 170 when the mold is in the closed, or the substantially closed position, as shown in FIGS. 5 and 9. In these positions the balls 180 are engaged with the shoulders 192 so that movement of the rod 12 in the direction of the arrow 120, as shown in FIG. 5, causes the plates 30, 34, 60, 36, 38 and 122 to be moved together. When the mold is opened to the extent shown in FIG. 6, the balls 180 being out of alignment with the large diameter portion of the pins 170, and retracted to be disengaged from the shoulders 192, the plate 122 will not be moved farther with the plate 38. On closing the mold from the completely opened position, shown in FIG. 7, moving the rod 12 in the direction opposite to the arrow 120, the small diameter portions 190 are moved onto the sleeves 176, and when the large diameter portions of the pins 170 are again in alignment with the balls they are moved outwardly to be in position to engage the shoulders 192 so that when the mold is again moved to open, the plate 122 will be moved to the floated predetermined position shown in FIGS. 6 and 7.

Figure 11:
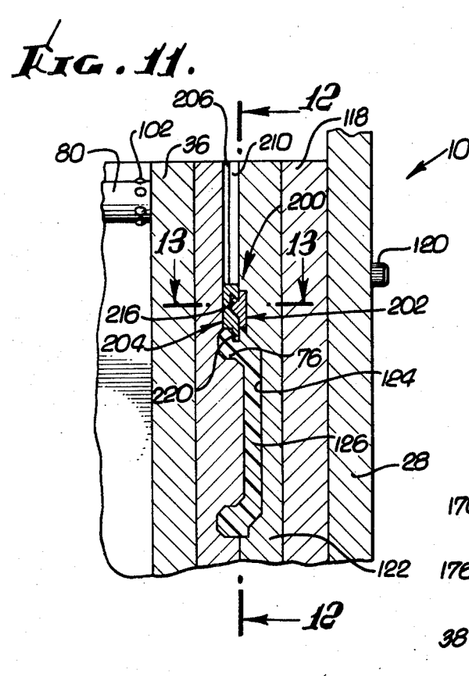
FIG. 11 is a fragmentary cross-sectional view illustrating a side entry bore forming portion in a molded part, taken along the line 11—11 in FIG. 12.
Figure 12:
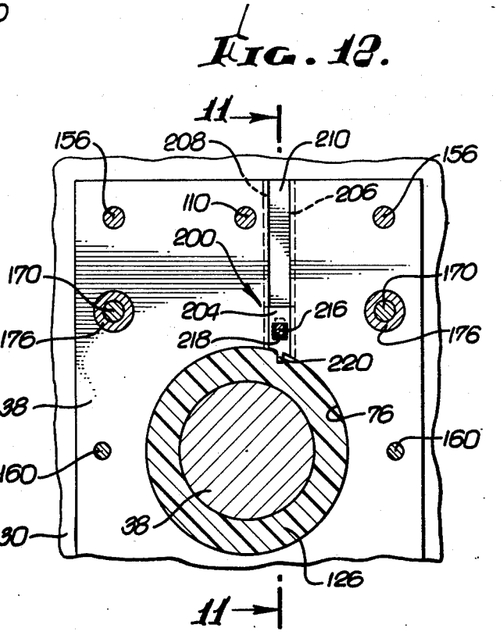
FIG. 12 is a fragmentary view, taken along the line 12—12 in FIG. 11.
Figure 13:
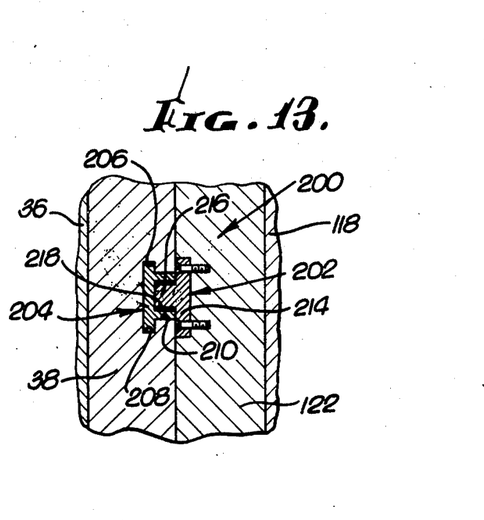
FIG. 13 is a cross-sectional view, taken along the line 13—13 in FIG. 11.
Figure 14:
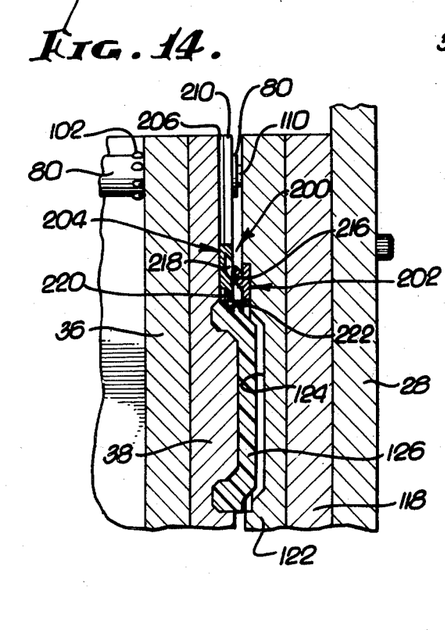
FIG. 14 is a view similar to FIG. 11, illustrating the disengagement of the parts.

As shown in FIGS. 11–14, a cylindrical bore-forming device, generally designated as 200, is comprised of a part 202 secured to the plate 122 and a slidable part 204 adapted to slide laterally in a pair of opposed channel-shaped slots 206 and 208 in the plate 38. The slidable part 204 has a T-bar, the oppsite ends of which fit into the opposing slots 206 and 208. Outwardly of the slots in the plate 38 is a rectangularly shaped opening 210, which with the slots completes a T-shaped cutaway portion in cross section, as best seen in FIG. 13. The fixed member 202 has a flat base portion 214 fitted within the plate 122 and extending therefrom is a canted pin 216, being rectangular in plan and end views and being a parallelogram in side view, as shown in FIGS. 11, 12 and 14.

The member 204 has a canted recess 218 adapted to receive the canted pin when plates 122 and 38 are together, as shown in FIG. 11, the pin being automatically removable from the recess 218 when the plates are moved apart, as shown in FIG. 14, as the member 204 is moved slidably within the plate 38 by the pin 216

At the inner end of the member 204, there is a cylindrical pin 220 adapted to be within the mold cavity when the mold is closed, and being moved slidably out of the cavity when the mold is opened, as shown in FIG. 14. The pin 220 forms a cylindrical bore 222 in the workpiece when it is molded in the cavity. The early return feature of the ejector plate 60 and its pins 62 and 64 is provided to assure the avoidance of damaging contact between the bore-forming pin 220, or other similar devices, and the ejector pins within the cavity when the mold is closing.

In operation, when the parts of the molding press are in closed position, as shown in FIGS. 1 and 2, the plastic molding material is injected into the cavities through the nozzle 136, and when the mold is filled and the workpiece 126 is formed and ready for ejection, the mold is opened by movement of the rod 12 in the direction of the arrow 120, as shown in FIG. 3. Movement of the rod 12, typically by a hydraulic ram, moves the plates 34, 36 and 38 in the same direction and in this movement the plate 34 moves with respect to the rods 46 and 48.

The opening movement which has occured, as shown in FIGS. 3 and 5, as distinct from the closed position in FIG. 2, occurs as the result of play in the high tolerance structure. As may be noted in FIG. 2, the balls 102 are spaced from the plate 36 so that movement of the plate on the sleeves 80, as shown in FIG. 3, brings the plate into contact with the balls. Similarly, the movement of the plate 38 away from the plate 122 brings the balls 180 into contact with the shoulder 192. These movements are the extent of the play. Thereafter, as the rod 12 continues to move in the direction of the arrow 120, the engagement of the balls 102 with the plate 36 causes the sleeves 80 and the ejector plate 60 to be moved with the rod 12 and the other plates.

Figure 6:
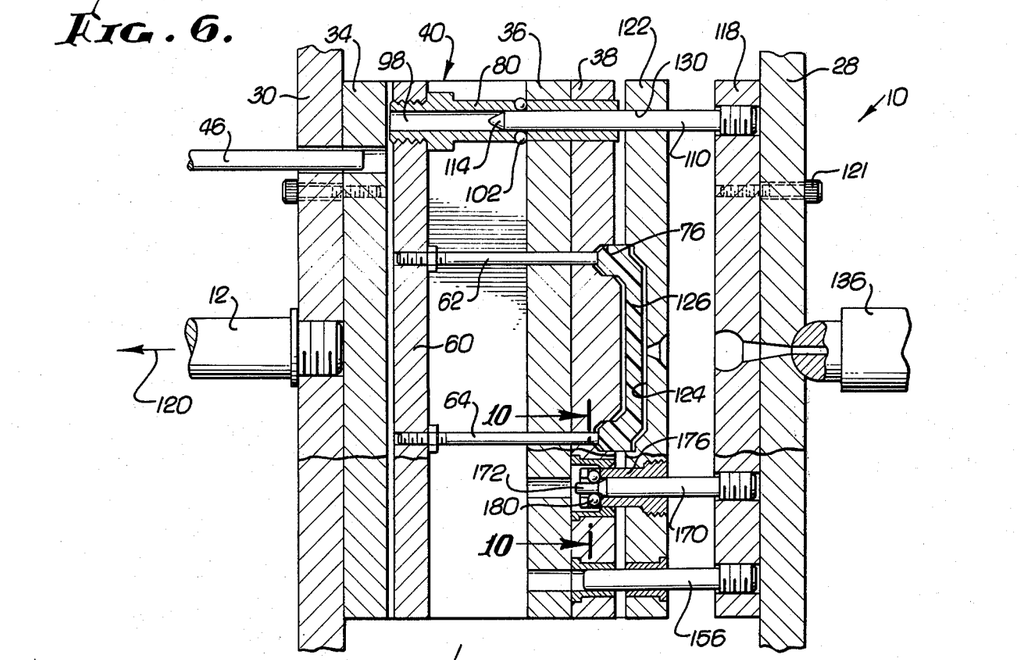
FIG. 6 is a cross-sectional view, similar to FIG. 3, illustrating the floating position of a plate, and having a cutaway portion illustrating the operation of a spacing device.

As shown in FIG. 5, the balls 180 are in contact with the shoulders 192 so that movement of the plate 38 causes movement of the plate 122 to the predetermined position shown in FIGS. 6 and 7. Here, the plate 122 has been spaced or floated from the plate 118 a predetermined amount which is sufficient to remove the sprue, and in a multiple cavity mold, to remove the runners from between the two plates and the injection orifices, as necessary. The floating of the plate 122 also provides space for removing molded parts from split cavities. The movement of the plate 122 is stopped at this position because the large diameter portion of the pin 170 has moved out of radial alignment with the balls 180 so as to permit them to move radially inwardly into their retracted position and disengage from the shoulders 192.

After the balls 180 are disengaged from the shoulders 192, the plates 34, 60, 36 and 38 continue to move with the rod 12 until the balls 102 are moved out of radial alignment with the cylindrical portions of the pins 110 at which predetermined position the balls 102 are moved from the expanded to the retracted position so as to permit the plate 36 to move over them, FIGS. 6, 7, at which point the plate 60 is no longer moved with the rod 12. Just after the balls 102 are retracted, the plate 60 makes contact with the rods 46 and 48, as shown in FIG. 7, which are a positive stop for the ejector plate and the ejector pins 62 and 64.

As shown in FIG. 2, the ejector pins 62 and 64 extend to the cavity portion 76 so that when the plate 38 is moved to the position shown in FIG. 3, the cavity is moved onto the ejector pins to start the ejection of the workpiece 126. During the movement of the plate 122 to its floating position, FIG. 6, the ejector pins are not moved significantly with respect to the workpiece, but as shown in FIG. 7, as the plate 38 moves from the floated plate 122 there has been substantial relative movement between the ejector pins and the plate 38, the workpiece being shown schematically and in contact with the ejector pins. Actually the workpiece, also having been removed from the cavity 124 because of the nature of the mold construction, would have fallen away from the ejector pins before they moved to their position in FIG. 7.

All movement is stopped when the plate 36 makes contact with spacer bosses 84 on the sleeves 80, the plate 60 having been previously stopped by the pins 46 and 48. At these positions as shown in FIG. 7, the mold is completely opened. Further, as shown in FIG. 14, the cylindrical pin 220 on the bore forming device had been moved out of the mold cavities and the workpiece just after the completion of the play movement shown in FIG. 3.

When the mold starts to close, moving in the opposite direction to the arrow 120, the rod 12 moving the plates 34, 60, 36 and 38, as shown in FIG. 7, the ejector plate 60 can move only a short distance because the balls 102, held inwardly by the plates 38 and 36, engage the pins 110 to stop the sleeves 80 and the plate 60. As the plates 34, 36 and 38 continue to move, sliding on the sleeves 80, the cavity 76 is withdrawn from the ejector pins 62 and 64. This provides an early return of the ejector from the mold cavities and prevents damages to any structure which may be moving into the cavities, such as the bore forming device 200 and specifically the pin 220.

The ejector remains stopped until the balls 102 move out of plate 36 into their expanded position, as shown in FIG. 3. At this position the sleeves 80 are free to move on the pins 110. Shortly thereafter, the plate 34 contacts the ejector plate 60 and it is moved toward closing with the plates 34, 36 and 38.

As the closing movement continues, the plate 38 moves onto the sleeves 176, the balls 180 being in the retracted position, shown in FIGS. 6 and 7. The plate 38 then contacts the plate 122 and they move to close the mold with the plate 122 contacting the plate 118, as shown in FIG. 2. As shown in FIG. 5, the balls 180 have moved into the expanded position by cylindrical surfaces of the pins 170 but this does not effect the closing movement.

It should be clear that the device which provides the early return for the ejector and plate floating device will be useful in structures in addition to those shown here. The benefits of easy installation in the faces of plates rather than in the end should be readily appreciated.

The molding press shown is generally schematic. In presses in use it is more typical to have the A and B plates and the ejector housing about the same size as the frame members 28 and 30 so there is no convenient or adequate space for external early return and plate floating devices. In these situations the space advantages provided by the present invention are very substantial.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. I do not wish to be restricted to the specific form shown or uses mentioned except as defined in the accompanying claims, wherein various portions have been separated for clarity of reading and not for emphasis.

I claim:

1. In an apparatus having three parts engageable for relative movement, the parts being a first outer part and a second outer part having an intermediate part therebetween, means for spacing the intermediate part from the first and second parts by movement of the intermediate and second parts away from the first part, said means comprising:

elongated means extending from and having one end thereof fixed to the first part, said elongated means being adapted to slidably enter the intermediate and second parts for relative movement therewith, radially expansible and contractible means carried by said intermediate part and being slidably engageable with said second part and with said elongated means, said second part having a small diameter opening to receive said expansible and contractible means in slidable engagement and having a large diameter opening extending from said small diameter opening defining a shoulder at the end of the small diameter opening, said expansible and contractible means being adapted to contract when said elongated member is in a predetermined position relative to said last means, said expansible and contractible means being adapted to enter said small diameter opening when said last means is contracted, said elongated means being adapted to cause said expansible and contractible means to expand to abut said shoulder when said elongated means is in a second predetermined position, and said expansible and contractible means are within said large diameter opening, whereby when said second part is moved away from said first part with said shoulder in abutment with said expanded means, said intermediate part is moved away from said first part, and when said intermediate part is moved away from said first part a predetermined amount, said elongated means is in first predetermined position to permit contraction of said expanded means and disengagement from said shoulder to cause said second part to be movable away from said intermediate part, said apparatus is a power actuated molding press, said first part being a fixed clamp plate through which the molding material flows, said intermediate part being an intermediate slidable plate having a first molding cavity therein and into which said molding material flows from the clamp plate, said second part being a second slidable plate having a second molding cavity forming the complete mold with said first cavity, and said second plate being movable toward and away from said fixed clamp plate by means of a power actuator.

2. The invention according to claim 1 in which:

said intermediate and second plates being slidable on rods fixed to said clamp plate.

3. In an apparatus having first and second parts adapted for relative movement toward and away from each other and for movement together, comprising:

a first part having one end of an elongated member fixed thereto, a second part having said elongated member in slidable engagement therewith, a fixed member in slidable engagement with said elongated member, protrusion means carried by said elongated member, said protrusion means being adapted to protrude in an outward position and in an alternate inward position with respect to said elongated member, said protrusion means being radially alignable with said fixed member, said fixed member being adapted to hold said protrusion means in the outward position when radially aligned therewith, and to release said protrusion means to be in the inward position when out of radial alignment, said second part being adapted to engage said protrusion means in the outward position when moved in one direction so as to move said first part in the same one direction, said protrusion means being movable out of radial alignment with said fixed member when said second part is moved to a predetermined position in said one direction to release said protrusion means to move inwardly to the inward position whereby continued movement of said second part ceases to move said first part in one direction, said second part being adapted to be moved in the opposite direction when said protrusion means is in the inward position, said first part being prevented from movement in the opposite direction when said protrusion means is in the inward position, said first and second parts being movable together in said opposite direction when said second part moves past said predetermined position in the opposite direction, said protrusion means being in the outward position, said first and second parts are first and second slidable plates, said elongated member being a sleeve and said fixed member being a cylindrical pin slidably engaged within said sleeve, said protrusion means are annularly spaced balls retained in annularly spaced holes in a wall of said sleeve, said pin has a conical point on its end, said apparatus is a power actuated molding press, said second plate being slidably movable in said directions by a power actuator, said second plate having a molding cavity therein opening away from said first plate, said second plate having openings therethrough to the cavity to receive ejector pins therein, said first plate being an ejector plate having ejector pins secured therein, said ejector pins extending to the cavity when the mold is in a closed position, said mold being opened by moving said second plate in said one direction, fixed means to prevent movement of said first plate in said one direction when said second plate has moved in said one direction to said predetermined position, whereby continued movement of said second plate in said one direction moves said cavity so that said ejector pins extend therein to eject a molded piece therein, and whereby when said second plate is moved in said opposite direction said cavity moves away from said ejector pins, said first plate being prevented from movement in said opposite direction until said second plate moves past said predetermined position.

4. In a power actuated molding press,
a fixed clamp plate,
a first slidable mold cavity plate juxtaposed to said fixed plate,
a second slidable mold cavity plate juxtaposed to said first plate, said cavities being aligned and open toward each other,
said first and second plates being adapted to be moved into contact to form a closed mold cavity of the cavities in the two plates, said first plate being adapted to be moved into contact with said fixed plate by the movement of the second plate against the first plate to close the mold,
a slidable ejector plate juxtaposed to said second plate,
power means connected to slidably move said second plate in one direction and in an opposite direction thereto,
the improvement comprising:
first means carried by said first plate and second means carried by said second plate, and
fixed means carried by said fixed plate being cooperatively engaged with said first and second means carried so as to lock the first and second plates together when the mold is closed, whereby movement of said second plate in said one direction is adapted to move said first plate to a first predetermined position spaced from the fixed clamp plate,
said fixed means being disengaged from said first and second means carried to unlock said first and second plates when said first plate is at said first predetermined position whereby continued movement of said second plate in said one direction ceases to move said first plate.

5. The invention according to claim 4 including:
a slidable member secured to said ejector plate and slidably engaged with said second plate,
third means carried by said slidable member engageable by said second plate,
fixed means slidably engaging said slidable member being adapted to engage and hold said third means carried thereby in driving engagement with said second plate, when said second plate is moved in one direction said slidable member and said ejector plate are moved in said one direction, and
said third means carried by said slidable member being released from said driving engagement when said second plate has moved a predetermined amount in said one direction to a second predetermined position to permit said third means carried to disengage from said second plate whereby movement thereof in said one direction ceases to move said slidable member and said ejector plate in said one direction,
said second plate being movable in an opposite direction when said third means carried by said slidable member is disengaged from said second plate,
said fixed means being adapted to engage said third means carried by said slidable member to prevent said slidable member and said ejector plate from being moved in said opposite direction when said second plate has moved past said second predetermined position in said one direction,
said ejector and second plates being movable together in said opposite direction when said second plate moves past said second predetermined position in said opposite direction.

6. The invention according to claim 5 including:
ejector pins secured to the ejector plate and extending to the cavity in the second plate when the mold is in a closed position,
said mold being opened by moving said second plate in said one direction,
second fixed means to prevent movement of said ejector plate in said one direction when said second plate has moved in said one direction to said second predetermined position whereby continued movement of said second plate in said one direction moves the cavity therein so that said ejector pins extend therein to eject a molded piece therein, and whereby when said second plate cavity is moved in said opposite direction, it moves away from said ejector pins, said ejector plate being prevented from movement in said opposite direction until said second plate moves past said second predetermined position.

7. The invention according to claim 4 in which:

said first means carried by said first plate is a sleeve having annularly spaced balls retained in holes therethrough and which are movable radially to an outwardly locking position and inwardly to a released non-locking position, said second means carried by said second plate being a small diameter opening to receive said sleeve in slidable engagement and having a large diameter opening extending from said small diameter opening defining a shoulder at the end of the small diameter opening, said fixed means carried by the fixed plate being a pin in slidable engagement with said sleeve and in engagement with said balls to hold them in locking position when said mold is closed so as to be engageable with said shoulder, said pin extending approximately to said first predetermined position where it is disengaged from said balls to permit them to move inwardly.

8. The invention according to claim 5 in which:

said slidable member is a second sleeve, said third means carried by said second sleeve having annularly spaced balls retained in annularly spaced holes through a wall of said second sleeve, said balls being movable radially to an outwardly said driving engagement and to an inwardly released and disengaged position from said second plate, said fixed means slidably engaging said sleeve being a cylindrical pin for holding said balls radially outwardly in said driving engagement with said second plate, said pin extending away from said first plate approximately to said second predetermined position where it is disengaged from said balls to permit them to move inwardly to release them from said driving engagement.

* * * * *